(12) United States Patent
Forsyth et al.

(10) Patent No.: US 7,999,627 B2
(45) Date of Patent: Aug. 16, 2011

(54) RESONANT CIRCUIT ARRANGEMENT, METHOD FOR OPERATING SAID RESONANT CIRCUIT ARRANGEMENT AND METHOD FOR THE OPERATION AND USE THEREOF

(75) Inventors: Richard Forsyth, Graz (AT); Andreas Fitzi, Stäfa (CH)

(73) Assignee: Austriamicrosystems AG, Unterpremstaetten (AT)

( * ) Notice: Subject to any disclaimer, the term of this patent is extended or adjusted under 35 U.S.C. 154(b) by 1078 days.

(21) Appl. No.: 11/575,840

(22) PCT Filed: Sep. 23, 2005

(86) PCT No.: PCT/EP2005/010338
§ 371 (c)(1),
(2), (4) Date: May 14, 2007

(87) PCT Pub. No.: WO2006/032527
PCT Pub. Date: Mar. 30, 2006

(65) Prior Publication Data
US 2007/0279142 A1 Dec. 6, 2007

(30) Foreign Application Priority Data
Sep. 23, 2004 (DE) .......................... 10 2004 046 255

(51) Int. Cl.
*H03B 5/20* (2006.01)
(52) U.S. Cl. ................. 331/135; 231/117 R; 231/108 B
(58) Field of Classification Search ............... 331/117 R, 331/108 B, 135–137; 332/108, 119, 120, 332/141, 151; 375/268–270, 300, 303, 306–307, 375/320, 353
See application file for complete search history.

(56) References Cited

U.S. PATENT DOCUMENTS

| 3,290,581 | A | 12/1966 | Hooper |
| 6,185,264 | B1 | 2/2001 | Gashus |
| 6,271,651 | B1 * | 8/2001 | Stratakos et al. ............ 323/282 |
| 6,587,098 | B2 | 7/2003 | Teterwak |
| 7,064,312 | B2 | 6/2006 | Gold |
| 2001/0055005 | A1 | 12/2001 | Teterwak |
| 2003/0206069 | A1 | 11/2003 | Hanselmann |

FOREIGN PATENT DOCUMENTS

DE 197 23 307 12/1998
(Continued)

OTHER PUBLICATIONS

International Search Report for PCT/EP2005/010338.
(Continued)

*Primary Examiner* — Rexford N Barnie
*Assistant Examiner* — Jany Tran
(74) *Attorney, Agent, or Firm* — Fish & Richardson P.C.

(57) ABSTRACT

A resonant circuit arrangement is for generating an amplitude-shift-keyed and/or phase-shift-keyed signal. The resonant circuit arrangement includes a capacitive storage element having a first terminal and a second terminal. The first terminal is electrically connectable to a control voltage and the second terminal is electrically connected to a reference potential. The resonant circuit arrangement also includes an inductive storage element having a third terminal and a fourth terminal, where the third terminal is electrically connectable to the reference potential, a first switch for electrically connecting the fourth terminal to the reference potential, a second switch for electrically connecting the fourth terminal and the first terminal, and a control unit for driving the first and second switches based on transmission data.

14 Claims, 3 Drawing Sheets

FOREIGN PATENT DOCUMENTS

DE  102 50 396  5/2004

OTHER PUBLICATIONS

Written Opinion for PCT/EP2005/010338.

Examination Report for corresponding German Application 102004046255.0.
Authorized officer Agnes Wittmann-Regis, International Preliminary Report on Patentability International Application No. PCT/EP2005/010338, mailed May 10, 2007, 11 pages.

* cited by examiner

RESONANT CIRCUIT ARRANGEMENT, METHOD FOR OPERATING SAID RESONANT CIRCUIT ARRANGEMENT AND METHOD FOR THE OPERATION AND USE THEREOF

Resonant circuit arrangement, method for operating such a resonant circuit arrangement, and use of the latter.

The invention relates to a resonant circuit arrangement, to a method for operating such a resonant circuit arrangement, and to the use of the latter according to the precharacterizing clauses of the coordinate patent claims.

Resonant circuit arrangements are used as signal generators or transmitters in the low-frequency range for amplitude-shift-keyed or phase-shift-keyed signals. They may also be used in combined transmitting and receiving devices, so-called transponders.

A resonant circuit arrangement essentially comprises a capacitive storage element having an inductive storage element connected in parallel with it. After a storage element, usually the capacitive storage element, has been charged, the energy oscillates between the capacitive and inductive storage elements, with the result that there is a sinusoidal voltage across the capacitive and inductive storage elements. The current which flows through the inductive storage element is likewise sinusoidal and is phase-shifted by the value $\Pi/2$ with respect to the voltage. The inductive storage element is often in the form of an antenna, with the result that the generated signal is emitted and the arrangement is used as a transmitter.

In previous refinements of a resonant circuit arrangement, the inductive and capacitive storage elements are short-circuited by a parallel-connected switch when oscillation is intended to be interrupted. After the capacitive storage element has been recharged again, the resonant circuit arrangement can begin to oscillate again.

It is necessary to recharge the resonant circuit arrangement so that the latter begins to oscillate and the attenuation losses which occur in real resonant circuit arrangements and the emitted energy are compensated for. The oscillating resonant circuit arrangement is recharged for the purpose of compensating for the losses by connecting a DC voltage source, which is often in the form of a battery, to the capacitive storage element by means of a switch. In order to minimize the energy consumption during the recharging process and to avoid influencing the oscillation process, the capacitive storage element is connected to the DC voltage source only briefly if the energy oscillating in the resonant circuit is in the capacitive storage element. During recharging, it must be ensured that the voltage across the capacitive storage element at this time has the same polarity as the DC current source. Otherwise, connecting the capacitive storage element to the DC current source would result in the capacitive storage element being discharged and recharged in an energy-consuming manner.

Deliberately suppressing oscillation and the beginning of oscillation means that the resonant circuit arrangement is used to generate an amplitude-shift-keyed signal. In this case, each operation of suppressing oscillation is associated with discharging of the storage elements. Energy-consuming recharging of the capacitive storage element is required when it is desirable for the resonant circuit arrangement to begin to oscillate again.

A phase-shift-keyed signal can be generated by deliberately rapidly discharging and recharging the storage elements. For this purpose, the capacitive storage element is discharged if the energy oscillating in the resonant circuit is in the capacitive storage element and the voltage across the capacitive storage element has a polarity opposite to that of the DC voltage to be applied. Immediately after this, the capacitive storage element is recharged. The signal generated in this manner has a phase offset of $\Pi$ after the beginning of oscillation again. The energy consumption is very high in this method on account of the frequent discharging and recharging of the capacitive storage element.

Depending on the data to be transmitted, in which each bit can have a first or a second state, the energy-consuming recharging process occurs during amplitude-shift-keying each time the data stream to be transmitted changes from the first to the second state. The capacitive storage element is discharged in the event of a change from the second to the first state. In phase-shift-keying, the recharging process occurs during each state change.

The high energy consumption has a disadvantageous effect, in particular, when a battery is used as the constant voltage source on account of the limited service life of said battery. In the case of contactless data storage media which obtain the requisite energy from the field of a read/write device, a high energy consumption has a disadvantageous effect on the range.

Therefore, the object is to configure a resonant circuit arrangement in such a manner that it has a lower energy consumption. The intention is also to specify a corresponding method for operating a resonant circuit arrangement.

The object is achieved by means of the measures specified in the coordinate patent claims. Accordingly, provision is made of a resonant circuit arrangement comprising a capacitive storage element comprising a first terminal and a second terminal, the first terminal of which is connected to a terminal for providing a control voltage and the second terminal of which is connected to a terminal for a reference potential, and an inductive storage element comprising a first terminal and a second terminal, the first terminal of which is connected or can be connected to a terminal for the reference potential.

The resonant circuit arrangement is characterized in that provision is made of a first switch which can be used to connect the second terminal of the inductive storage element to a terminal for a reference potential, provision is made of a second switch which can be used to connect the second terminal of the inductive storage element to the first terminal of the capacitive storage element, and provision is made of a control unit for driving the first and second switches on the basis of the data to be transmitted.

Suitably selecting the switching states of the first and second switches makes it possible to terminate oscillation by rapidly discharging only the inductive storage element without influencing the charge stored in the capacitive storage element, with the result that the voltage across the capacitive storage element is used to start oscillation when the inductive and capacitive storage elements are connected again to form the resonant circuit. Alternatively, the capacitive storage element can also be connected to the DC voltage source when the inductive storage element has been short-circuited.

In one advantageous further development of the subject matter according to the invention, the first terminal of the inductive storage element can be connected both to a terminal for the reference potential by means of a third switch and to the first terminal of the capacitive storage element by means of a fourth switch. In this manner, it is also possible to generate phase-shift-keying, by driving the first to fourth switches in a suitable manner, without having to recharge the capacitive storage element.

The first terminal of the capacitive storage element can be connected to a DC voltage source, which is in the form of a battery, for example, by means of a fifth switch at the terminal for the control voltage. A suitable fifth switching signal makes it possible to control the recharging and charging of the capacitive storage element.

Oscillation is enabled or suppressed by selecting the switching states of the first to fourth switches. If the third and fourth switches are provided, a sinusoidal signal is produced across the inductive storage element by switching these four switches in a clocked manner.

In one advantageous further development of the resonant circuit arrangement, the inductive storage element is in the form of an antenna, with the result that the resonant circuit arrangement is in the form of a transmitter.

The object is also achieved by means of a method for operating a resonant circuit arrangement, in which an inductive storage element is connected in parallel with a capacitive storage element in a first operating mode. The resonant circuit is disconnected and the inductive storage element is short-circuited in a second operating mode. The process changes over between the first and second operating modes on the basis of data to be transmitted.

The inductive storage element or, in particular, the capacitive storage element is advantageously charged upon switching to the first operating mode, with the result that the resonant circuit begins to oscillate.

This is also the case if, upon switching from the first to the second operating mode, the energy stored in the capacitive storage element is maximal, with the result that the resonant circuit begins to oscillate again upon returning to the first operating mode.

Provision is advantageously made of a third operating mode in which the inductive storage element is connected in parallel with the capacitive storage element, the polarity of the inductive storage element being reversed in comparison with the first operating mode.

The process changes over between the first and third operating modes or between the second and third operating modes if the energy in the capacitive storage element is maximal. In this manner, the resonant circuit continues to oscillate during phase-shift-keying or it begins to oscillate again upon the returning from the second operating mode.

The process can also change over between the first and third operating mode, which is synonymous with reversing the polarity of the terminals of the inductive storage element if the capacitive storage element has been discharged. When the energy oscillates back into the capacitive storage element, the voltage across the capacitive storage element does not change its mathematical sign. This has the advantage, on the one hand, that the losses can be compensated for in shorter intervals and, on the other hand, that the phase-shift-keying is easier to generate.

Further advantageous refinements of the resonant circuit arrangement according to the invention and of the method according to the invention are specified in the subclaims.

The invention is explained below using exemplary embodiments and with reference to the drawing, in which.

Figure 1:
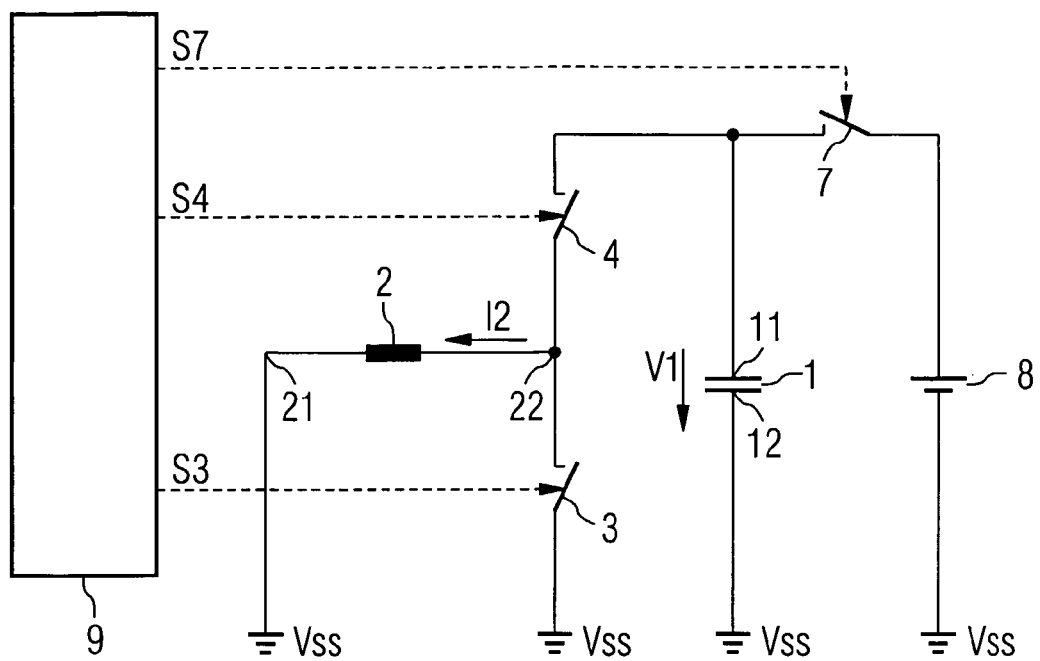
FIG. 1 shows a first, simple refinement of the resonant circuit arrangement.

The exemplary resonant circuit arrangement illustrated in FIG. 1 comprises a capacitive storage element 1 having a first terminal 11 and a second terminal 12 and an inductive storage element 2 having a first terminal 21 and a second terminal 22. The second terminal 22 of the inductive storage element 2 can be connected to a reference potential Vss by means of a first switch 3 and can be connected to the first terminal 11 of the capacitive storage element 1 by means of a second switch 4. The first terminal 21 of the inductive storage element 2 is connected to the reference potential. The first terminal 11 of the capacitive storage element 1 can be connected to a DC voltage source 8 by means of a fifth switch 7. The second terminal 12 of the capacitive storage element is connected to the reference potential Vss.

Provision is also made of a control unit 9 which provides a first, a second and a fifth switching signal S3, S4 and S7 for driving the first, second and fifth switches 3, 4 and 7.

Figure 2:
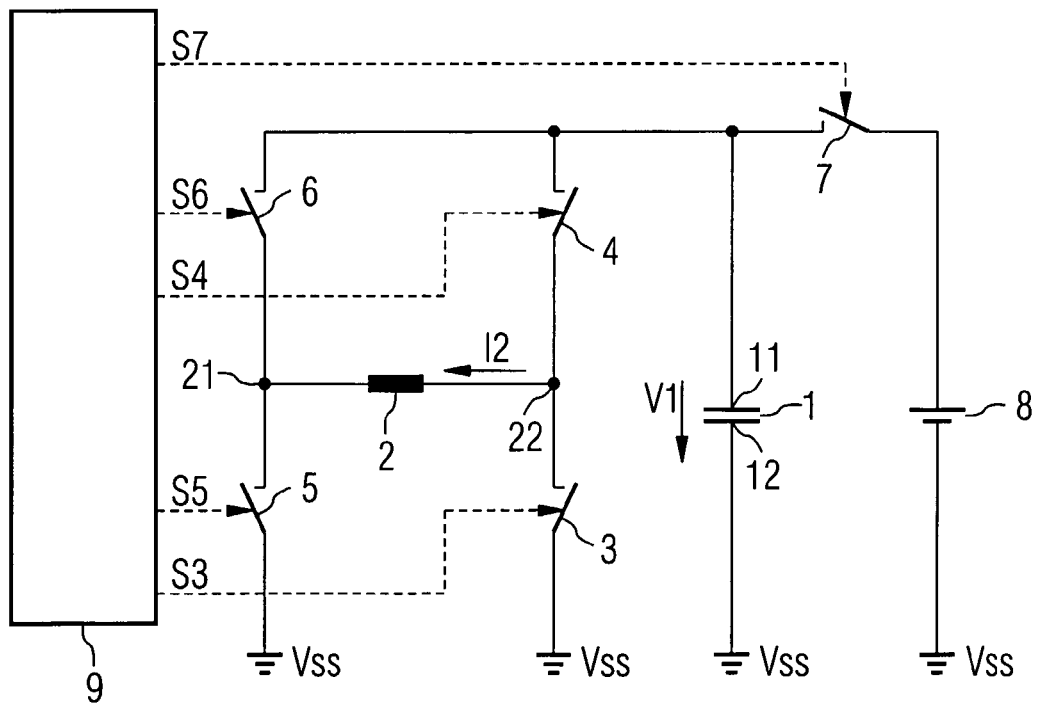
FIG. 2 shows a second, developed refinement of the resonant circuit arrangement.

In FIG. 2, the first refinement shown in FIG. 1 has been developed to the effect that the first terminal 21 of the inductive storage element 2 can be connected to the reference potential Vss by means of a third switch 5 and can be connected to the first terminal 11 of the capacitive storage element 1 by means of a fourth switch 6.

The control unit 9 provides further switching signals S5 and S6 for driving the third and fourth switches 5 and 6.

In FIG. 2, the first refinement shown in FIG. 1 has been developed to the effect that the first terminal 21 of the inductive storage element 2 can be connected to the reference potential Vss by means of a third switch 5 and can be connected to the first terminal 11 of the capacitive storage element 1 by means of a fourth switch 6.

The control unit 9 provides further switching signals S5 and S6 for driving the third and fourth switches 5 and 6.

Figure 3:
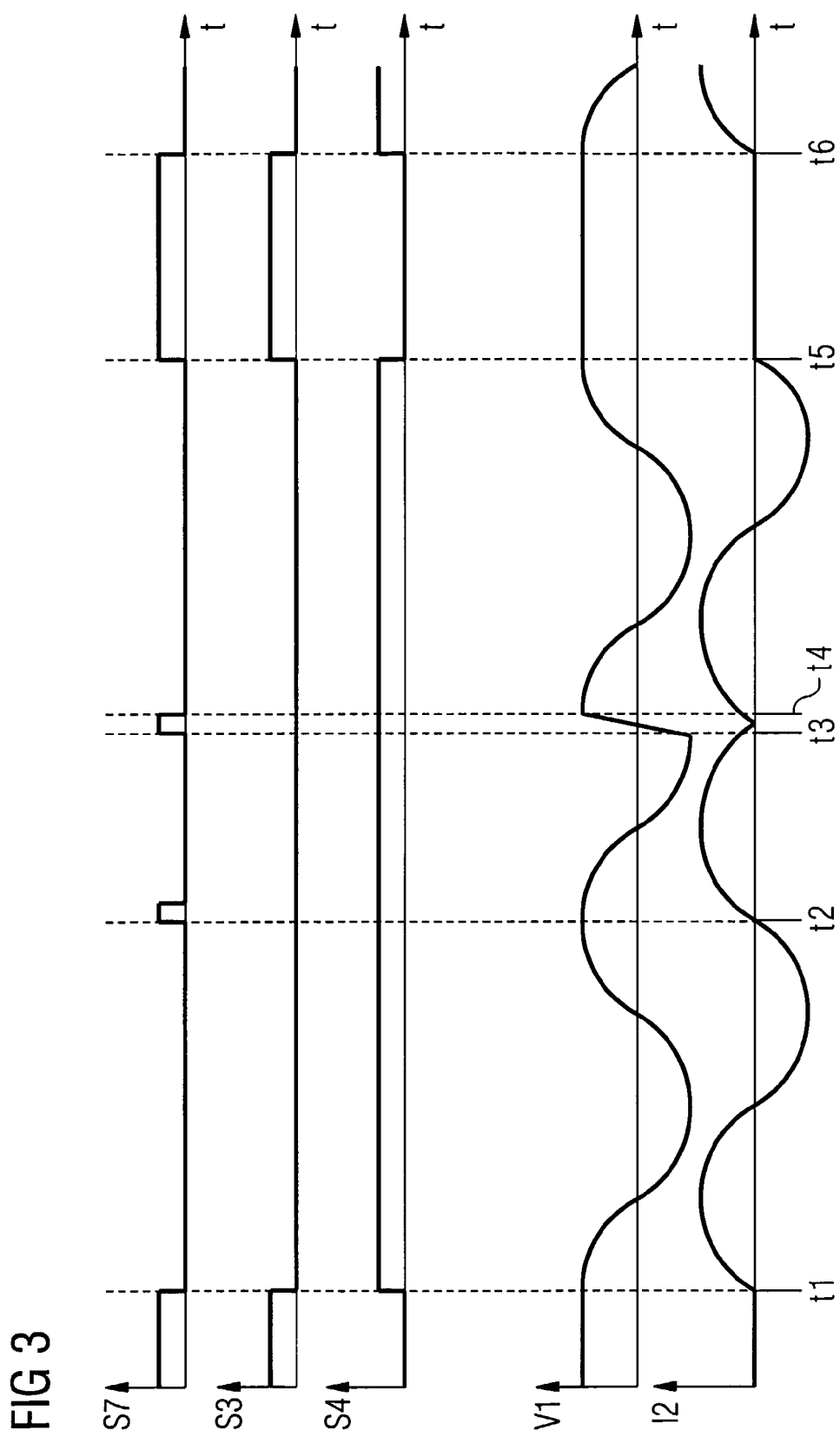
FIG. 3 shows a timing diagram of selected signals in the resonant circuit arrangement of FIG. 1.

FIG. 3 illustrates selected timing signals which illustrate operation of the resonant circuit arrangement illustrated in FIG. 1. In addition to the first, second and fifth switching signals S3, S4 and S7, a voltage V1 across the capacitive storage element 1 and a current I2 through the inductive storage element 2 are illustrated.

The switching signals S3, S4 and S7 under consideration are coupled to the corresponding switches 3, 4 and 7 in such a manner that the respective switch is off during a low level and is on during a high level.

In order to charge the capacitive storage element 1, the first switch 3 is on and the second switch 4 is off and the fifth switch 7 is likewise on. The inductive storage element 2 is short-circuited in this manner. The capacitive storage element 1 is charged by the DC voltage source 8.

In order to begin oscillation at the time t1, the first switch 3 and the second switch 4 are changed over and the fifth switch 7 is turned off. Changing over the first and second switches 3 and 4 again suppresses oscillation at the time t5. Changeover is advantageously effected if the voltage V1 across the capacitive storage element 1 is maximal.

Attenuation-induced losses in the voltage can be compensated for by briefly applying the DC voltage to the capacitive storage element 1 by turning on the fifth switch 7 if the voltage V1 across the capacitive storage element 1 is maximal. This is the case when there are local maxima during oscillation, such as at the time t2, and when suppressing the voltage by short-circuiting the inductive storage element 2, such as in the period of time between the times t5 and t6.

Phase-shift-keying can be achieved in the first, simple refinement by turning on the fifth switch 7 at the time t3 if the voltage V1 across the capacitive storage element 1 is minimal.

In this case, the DC voltage source whose polarity is opposite the polarity of the voltage across the capacitive storage element forces the capacitive storage element to be discharged and recharged, with the result that the voltage across the capacitive storage element then has the same polarity as the DC current source.

Alternatively, phase-shift-keying can also be achieved if the first switch 3 is briefly turned on, with the result that the capacitive storage element 1 is short-circuited if the voltage V1 across it is minimal, and is charged immediately afterward. The first switch 3 is then turned off and the resonant circuit begins to oscillate again. This gives rise to a sudden phase change in both the voltage V1 across the capacitive storage element 1 and in the current I2 in the inductive storage element 2. The discharging and recharging processes described are associated with a considerable amount of energy consumption.

Figure 4:
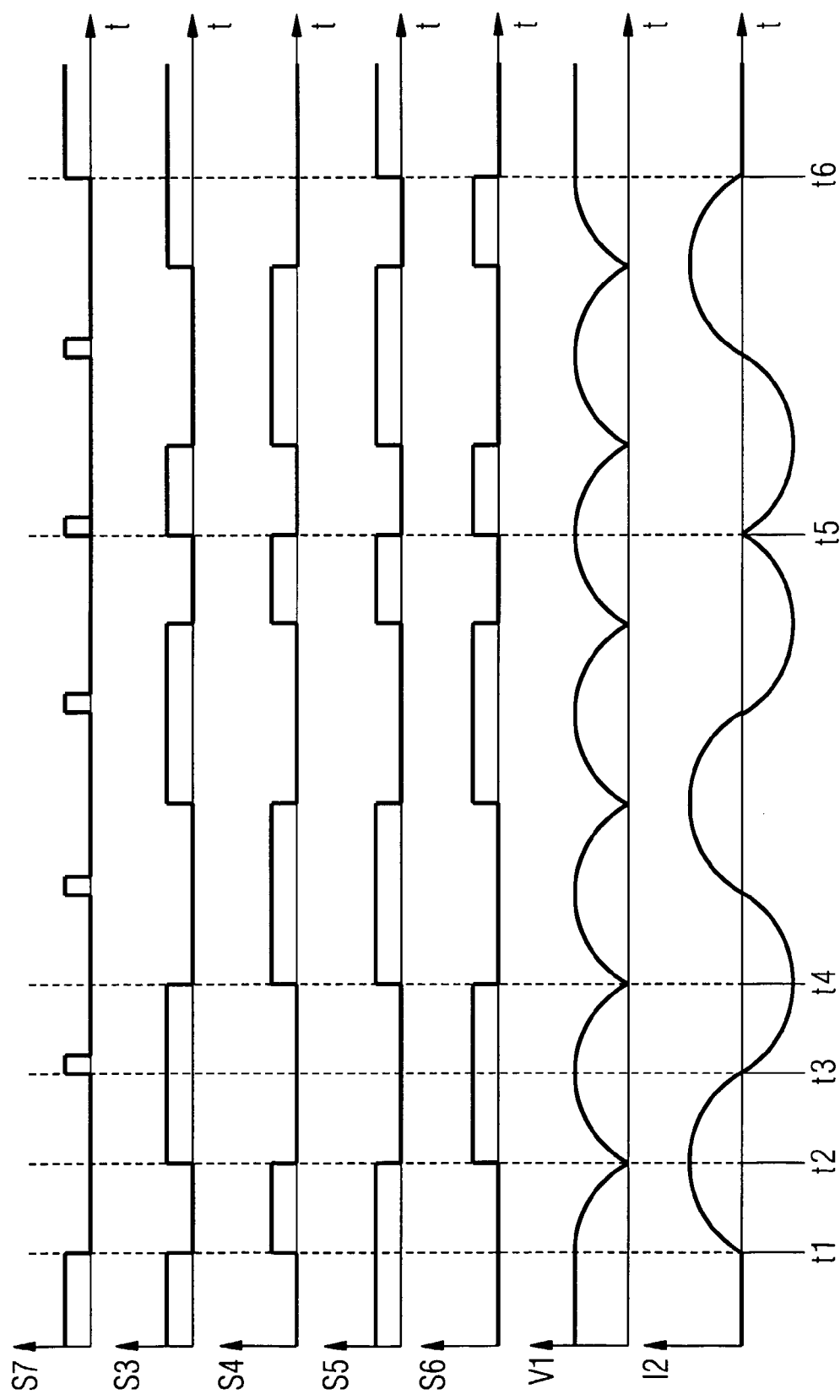
FIG. 4 shows another timing diagram of selected signals in the resonant circuit arrangement of FIG. 2.

FIG. 4 uses another timing diagram to illustrate how remedial action is taken by switching the first to fourth switches 3, 4, 5, 6 in a clocked manner in the developed refinement illustrated in FIG. 2.

In order to charge the capacitive storage element 1, the fifth switch 7 as well as the first switch 3 and the third switch 5 are turned on such that the inductive storage element 2 is short-circuited. The second and fourth switches 4 and 6 are off.

So that the resonant circuit arrangement begins to oscillate, the first switch 3 and the fourth switch 6 are simultaneously turned off at the time t1 and the second switch 4 and the third switch 5 are turned on. It goes without saying that the opposite switching states would also be conceivable for the first to fourth switches 3, 4, 5 and 6. As soon as the capacitive storage element has been discharged, the first and fourth switches 3, 4, 5 and 6 are changed over at the time t2, with the result that the connections between the terminals of the inductive storage element 2 and the terminals of the capacitive storage element 1 are interchanged. In this manner, the mathematical sign of the voltage V1 across the capacitive storage element 1 is not reversed when the energy flows back into the capacitive storage element 1. However, the current I2 flowing through the inductive storage element 2 flows in a sinusoidal manner since the first to fourth switches 3, 4, 5, 6 are changed over in a clocked manner if, at the time t4, there is no energy stored in the capacitive storage element 1 and the direction in which the current I2 flows through the inductive storage element is not changed.

In this embodiment, phase-shift-keying can be generated in a simple manner by changing over the first to fourth switches 3, 4, 5 and 6 at the time t5 if the energy in the capacitive storage element 1 is maximal. In this manner, the current I2 flowing back into the inductive storage element 2 immediately afterward has a phase offset of Π.

Oscillation is suppressed by short-circuiting and discharging the inductive storage element 2 at the time t6 using the first and third switches 3 and 5 which are on. In the meantime, if the second and fourth switches 4 and 6 are off, the capacitive storage element 1 can be recharged by turning on the fifth switch 7.

Losses in the resonant circuit are compensated for by briefly turning on the fifth switch 7 in a clocked manner at the time t3, for example, if the energy in the capacitive storage element 1 is maximal.

Another advantage of changing over the first to fourth switches 3, 4, 5 and 6 in a clocked manner as shown in FIG. 4 can be seen in the temporal profile of the voltage V1 dropped across the capacitive storage element 1. As a result of the fact that the mathematical sign of the voltage V1 across the capacitive storage element 1 is always the same when the energy stored in the capacitive storage element 1 is maximal, it is no longer necessary to distinguish between whether the voltage V1 across the capacitive storage element 1 is maximal or minimal when short-circuiting the inductive storage element 2. The situation in which the voltage V1 across the capacitive storage element 1 has a mathematical sign opposite that of the charging DC voltage source does not occur. In this manner, there is no need for any energy-consuming reversal of the charge of the capacitive storage element 1.

It goes without saying that it is also possible to operate the resonant circuit arrangement shown in FIG. 2 in the same manner as described for the resonant circuit arrangement shown in FIG. 1. In this case, the third and fourth switching signals S5 and S6 are selected in such a manner that the third switch 5 is on and the fourth switch 6 is off. This corresponds to the practice of adding or omitting fixed connections at the appropriate locations, by means of which the developed configuration shown in FIG. 2 can be converted into the simple refinement shown in FIG. 1.

REFERENCE SYMBOLS

1 Capacitive storage element
11 First terminal of the capacitive storage element
12 Second terminal of the capacitive storage element
2 Inductive storage element
21 First terminal of the inductive storage element
22 Second terminal of the inductive storage element
3 First switch
4 Second switch
5 Third switch
6 Fourth switch
7 Fifth switch
8 Dc voltage source
9 Control unit
S3 First switching signal
S4 Second switching signal
S5 Third switching signal
S6 Fourth switching signal
S7 Fifth switching signal
V1 Voltage across the capacitive storage element
I2 Current through the inductive storage element

The invention claimed is:

1. A resonant circuit arrangement for generating an amplitude-shift-keyed and/or phase-shift-keyed signal, the resonant circuit arrangement comprising:
   a capacitive storage element comprising a first terminal and a second terminal, the first terminal being electrically connectable to a control voltage and the second terminal being electrically connected to a reference potential;
   an inductive storage element comprising a third terminal and a fourth terminal, the third terminal being electrically connectable to the reference potential;
   a first switch for electrically connecting the fourth terminal to the reference potential;
   a second switch for electrically connecting the fourth terminal and the first terminal;
   a control unit for driving the first and second switches based on transmission data;
   a third switch for electrically connecting the third terminal to the reference potential; and
   a fourth switch for electrically connecting the third terminal and the first terminal.

2. The resonant circuit arrangement of claim 1, further comprising:
   a fifth switch for electrically connecting a DC voltage source to the first terminal.

3. The resonant circuit arrangement of claim 1, wherein the first, second, third and fourth switches are controllable so that:
 the first and fourth switches are closed when the second and third switches are open; or
 the first and fourth switches are open when the second and third switches are closed.

4. The resonant circuit arrangement of claim 1, further comprising:
 a fifth switch for electrically connecting a DC voltage source to the first terminal;
 wherein a control signal for driving the fifth switch is controllable so that the fifth switch is on for a lesser period of time than the first, second, third and fourth switches.

5. The resonant circuit arrangement of claim 1, wherein the inductive storage element comprises an antenna.

6. A method comprising:
 using the apparatus of claim 1 to generate an amplitude-shift-keyed and/or phase-shift-keyed signal in a transmitter or transponder.

7. A method for operating a resonant circuit arrangement, the method comprising:
 in a first operating mode, electrically connecting an inductive storage element in parallel with a capacitive storage element;
 in a second operating mode, disconnecting the resonant circuit arrangement from a DC voltage source and short-circuiting the inductive storage element; and
 switching between the first and second operating modes based on transmission data.

8. The method of claim 7, wherein either the capacitive storage element or the inductive storage element is charged upon switching to the first operating mode.

9. The method of claim 7, wherein the capacitive storage element is charged in the first operating mode by applying a DC voltage if a difference between the DC voltage and a voltage across the capacitive storage element is minimal.

10. The method of claim 7, wherein the method switches from the first to the second operating mode if the capacitive storage element is about fully charged.

11. The method as claimed in claim 7, wherein the first operating mode is interrupted or is terminated before changing to another operating mode by:
 discharging the capacitive storage element if a voltage across the capacitive storage element is minimal; and
 charging the capacitive storage element by applying a DC voltage for a limited time.

12. The method of claim 7, wherein the inductive storage element is electrically connected in parallel with the capacitive storage element in a third operating mode, and wherein a polarity of the inductive storage element is reversed in the third operating mode relative to the first operating mode.

13. The method of claim 12, wherein the method switches between the first and third operating modes or between the second and third operating modes if the capacitive storage element is about fully charged.

14. The method of claim 12, wherein the method switches between the first and third operating modes if the inductive storage element is about fully charged.

\* \* \* \* \*